May 12, 1931.    G. A. VIS    1,805,384

METHOD OF MAKING CAP NUTS

Filed March 2, 1927

INVENTOR:
GEORGE A. VIS
BY John P. Barbox
ATTORNEY.

Patented May 12, 1931

1,805,384

UNITED STATES PATENT OFFICE

GEORGE A. VIS, OF DETROIT, MICHIGAN, ASSIGNOR TO BUDD WHEEL COMPANY, OF PHILADELPHIA, PENNSYLVANIA, A CORPORATION OF PENNSYLVANIA

METHOD OF MAKING CAP NUTS

Application filed March 2, 1927. Serial No. 171,914.

This invention relates to a method of making cap nuts.

An object is to provide a method by which the various steps are carried out with great accuracy, producing corresponding accuracy in the product.

Another object consists in providing an accurate reference plane or surface on the article, and referring all the operations thereafter performed on the article to such plane or surface.

The invention also provides a method which is readily carried out on machines of well-known types, even on machines of the automatic screw machine type.

The method of the invention is explained with reference to a specific type of nut as illustrated in the accompanying drawings in which.

Figure 5:
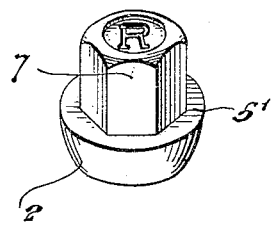
Figure 3:
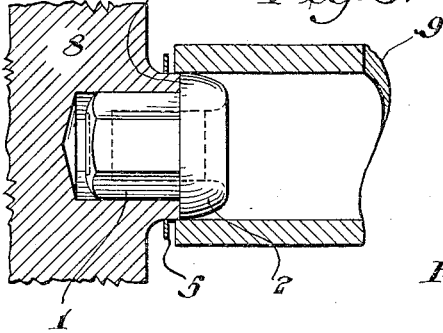
Figure 6:
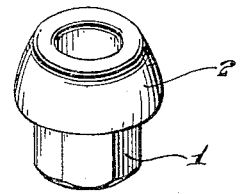
Figure 4:
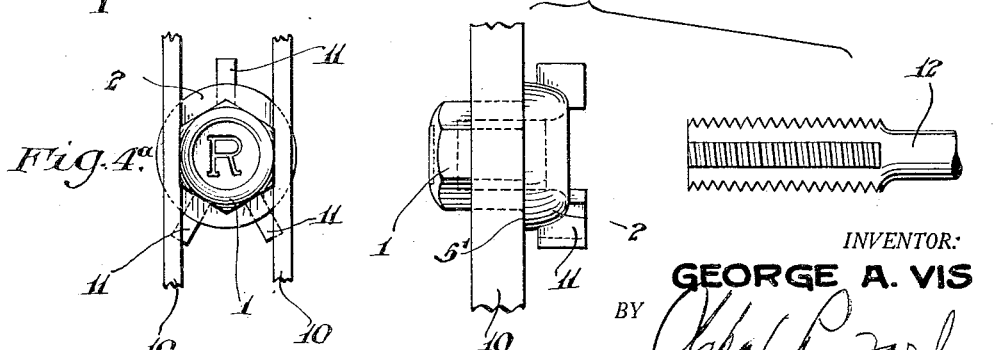

Fig. 3 the third step; Figure 4 the fourth and Figures 5 and 6 are perspective views of the finished nut.

Fig. 4ª shows the nut held by the guiding members.

The illustrative nut constitutes only one of the many possible forms that may be produced by the practice of this invention. As shown in Figures 5 and 6 the nut comprises a hexagonal prismatic body 1, and a ball or spherical face 2, separated by a surface 5'; in this instance, a plane surface at right angles to the axis of the nut. This latter feature, the surface 5', is generic to all the various products of the method, although it may occur in different forms.

Figure 1:
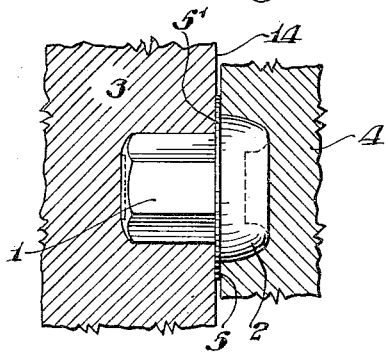
Fig. 1 shows a sectional view of the dies which produce the nut, with a rough nut in elevation therein.

The nut shown in Figure 1 has just been completed by pressure between coacting dies 3, 4 in a "heading" or upsetting machine. The excess of metal supplied in the blank has formed the usual and necessary flash 5 between the dies. This flash 5, it will be noted, is a continuation of the surface 5', referred to above, and forms with it the reference plane which is one of the objects of this invention.

Figure 2:
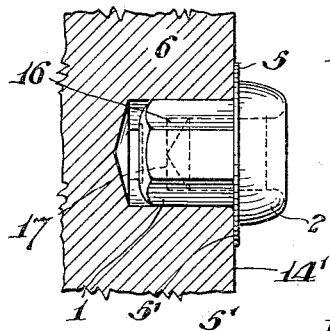
Fig. 2 illustrates the second step of the method.

Figure 2 illustrates the second step of the method, in which the rough nut has been placed in a holder or chuck 6 with the surface 5' and the flash 5 in contact with a supporting surface 14', which corresponds to the face 14 of the forming die. Thus a bearing of substantial extent is provided which locates the nut in the holder with its formed surfaces in proper alignment with the drill 7. As a result the drilled hole must infallibly be concentric with the spherical surface 2 and the body 1. The drill 7 is representative of as many drilling, reaming, bottoming or countersinking operations, as are deemed necessary, as well as any other similar ones.

In Figure 3, the drilling completed, the nut has been passed on to another holder or chuck 8, in order to be trimmed of its flash 5, by means of the hollow punch 9. Following this, although not shown in the drawing, the spherical face 2 may be finished or trued by a cutting tool.

Finally, in Figure 4, the nut has passed onto the guiding and holding members, 10, which support the surface 5' to align the drilled hole with the tap 12, and also cooperate with the "flats" of the hexagonal body to prevent rotation of the nut while being tapped. A clamping and aligning member 11 has three-point bearing on the spherical face 2 of the nut, and, with the members 10, forms positive means for holding and aligning the nut while being tapped.

In Fig. 4ª the nut is shown guided by the members 10 contacting with opposite "flats" and the surface 5' by which alignment is maintained through the pressure of the member 11.

The method described in detail above, does not constitute the sole embodiment of the invention. Taking the several steps in order:

Figure 1, representing the formation of the rough nut shows an upsetting or heading operation, similar in some ways to that of application Serial No. 162,442, filed January 21, 1927. Obviously, the rough nut could be formed in any other way, by machining, forging, casting, etc.

Figure 2 representing the drilling operation, is not to be restricted in any way, since the nut might be perforated through, as by a punch, without affecting the method.

In Figure 3, while the operation of trimming the flash is shown as performed by a hollow punch, it could equally well be done by a rotating nut support and fixed cutting tool, by forcing the nut through a die, etc.

Similarly, an equal latitude of modes of operating is to be assigned to Fig. 4.

The sequence of the operation does not necessarily adhere to that disclosed. It might be readily altered, leaving the trimming of the flash to the end, for example.

While I have shown specific means as one manner in which the invention may be practiced, it will be understood that I do not desire it to be limited by this disclosure, but only by the scope of the appended claims.

What I claim is:—

1. The method of making nuts which comprises the formation of a blank into the shape of the nut by pressure between dies producing a flash, thereby providing on the nut a reference surface comprising the flash produced by said die pressing operation, thereafter using said reference surface to locate and align the axis of the nut for a succeeding operation or operations, and finally cutting off the flash after such operation or operations.

2. The method of making nuts comprising the formation of their exteriors from a blank by an operation entailing the formation of a flash on the nuts and simultaneously forming a surface aligned with and in extension of said flash, thereupon utilizing said surface and flash as a reference plane for aligning the nuts for a subsequent operation or operations shaping the interior of the nut, and cutting off said flash after such operation or operations.

In testimony whereof he hereunto affixes his signature.

GEORGE A. VIS.